Patented Nov. 9, 1937

2,098,361

UNITED STATES PATENT OFFICE 2,098,361

RESIN PRODUCTION

Joseph Rivkin, Pittsburgh, Pa., assignor to The Neville Company, a corporation of Pennsylvania No Drawing. Application December 21, 1935, Serial No. 55,613

4 Claims. (Cl. 260—7)

This invention relates to the production of resins, and particularly to the production of resins formed by a reaction involving the polymerizable reactives occurring in hydrocarbon liquids and phenolic substances, to give a modified resin possessing solubility in the solvent alcohols. More specifically, the invention relates to improvements upon the method primarily disclosed in German Patent No. 302,543, issued November 8, 1919, to Ruetgerswerke Aktiengesellschaft, and to a mode of obtaining a yield of resin classified in accordance with the quality of alcohol solubility.

In accordance with the disclosure of that patent, I subject a reaction mixture of a polymerizable-containing hydrocarbon liquid and a phenolic substance to the reactivating effect of a catalyst consisting of sulphuric acid, or derivatives of sulphuric acid obtained by the substitution of one or two hydroxyl groups or one or two hydrogen atoms in the sulphuric acid by an organic group, which may be aliphatic or aromatic in nature and which may itself be substituted by other groups, such as hydroxyl groups or amine groups or the like. Throughout the specification and claims the term "sulphuric acid base" catalyst is used to define any one of these types of catalyst, inclusive of sulphuric acid.

My invention resides in so controlling the resin-producing reaction, and so proportioning the ingredients, and in so conducting the procedure of recovering resinous products, that I am able to obtain a resin of improved alcohol solubility, while obtaining a good yield of resinous products, under economical operating conditions. Whereas my application, divisional of this, Serial No. 89,847, filed July 9, 1936, relates more particularly to improvements over the procedure disclosed in German Patent No. 302,543 in order to obtain a resin of higher average alcohol solubility, this application deals more particularly with obtaining a fractional yield of phenol-modified coumarone resin having a higher than average alcohol solubility.

In my procedure, I may utilize any type of reaction vessel or apparatus known to be suitable for conducting reactions of this sort. Such known suitable vessels, or apparatus, are those designed for effective dispersion of the catalyst in the reactive liquid or blend, either by direct propeller agitation or by circulation, and which provide for temperature control by circulation of a heat-transferring fluid through channels such as coils, a jacket, or a heat exchanger arrangement. Into this vessel, or apparatus, I introduce a reaction mixture, which may be mixed in advance, or the ingredients of which may be separately introduced into the vessel. The reaction mixture comprises a hydrocarbon liquid, which carries the polymerizable bodies naturally occurring therein. In the crude solvent naphthas, having their initial origin in coal, the polymerizable bodies are predominantly of the coumarone-indene type, or of the dicyclopentadiene type, in accordance with the proximate source from which the naphthas are derived. With such polymerizable-containing hydrocarbon liquid, or mixture of liquids, I associate a phenolic substance, such as a phenol, a phenolic acid, or other aromatic compound which contains one or more hydroxyl groups attached to the organic nucleus, or the homologues and substitution products of such aromatic compounds. I then promote reaction in the reaction mixture by the addition of a sulphuric acid base catalyst; that is, a catalyst of the class hereinabove defined.

The reaction promoted by the sulphuric acid base catalyst is permitted to proceed under heat-abstracting conditions, as the heat of reaction tends to produce a temperature rise. During the reaction period I maintain the temperature of the reaction mixture below 60° C., and most desirably within the temperature range of 25° C. to 35° C. The reaction apparently consists in a polymerization of the hydrocarbon-contained polymerizables, accompanied by a phenolic involvement, in which the phenolic substance reacts with the bodies naturally occurring in the hydrocarbon in one or more of their molecular stages. The resultant reaction product consists of a resinous mass which is separable into a hard resin, and into a soft resin. In most instances the soft resin is fluid at normal room temperature. Both the hard and soft resins are soluble in the solvent alcohols, such, for example, as ethanol, isopropanol, methanol, and butanol. Both resins possess, inherently, compatibility with nitrocellulose, and the soft resin has an inherent tendency to dissolve cellulose acetate. An additional product resultant from the reaction is a solvent naphtha refined by the resin-forming reaction.

As to the proportion of the catalyst used, I have found the proportions given in Ruetgerswerke German Patent No. 302,543 substantially suitable. Thus, if we take a 500 gram test blend, comprising 390 grams of No. 2 crude solvent naphtha, which contains polymerizables of the coumarone-indene type, and 110 grams of cresol, I have found from 2.5 grams to 15 grams of concentrated sulphuric acid, or from 20 grams to 30 grams of cresol-sulphonic acid adequate to promote the resin-forming reactions. It is, however, to be understood that the proportional quantity of sulphuric acid base catalyst used may be varied within wide limits. In this reaction mixture or blend the crude solvent naphtha contained 60% polymerizables, which may be considered standard content in the polymerization of coumarone and indene.

I have found that the proper basis for proportioning the phenolic content of the blend and the hydrocarbon-contained polymerizables is on the basis of the content of the latter in the hydrocarbon liquid in which they occur. For example, I have found it desirable to include from 12% upward by weight of the phenolic substance as compared with the weight of the total blend of phenolic substance and crude solvent naphtha on the basis of a 60% content of polymerizables in the crude solvent naphtha. For example, as given above, the cresol is equal to 47% the weight of 60% the weight of crude solvent naphtha, and otherwise stated it is 22% of the total blend of crude solvent naphtha and cresol. Stating the desirable phenolic minimum in terms of the polymerizable content, the phenolic inclusion is desirably not substantially less than 22% the weight of the polymerizables.

Fundamentally considered, I so conduct my reaction that the conditions are particularly favorable to phenolic involvement in the reaction. Factors rendering the conditions favorable to phenolic involvement are the high percentage of phenolic substance used, and temperature control. I have found as a general relationship that by utilizing relatively great percentage quantities of phenol, and maintaining the reaction temperature relatively low, I obtain resins of increased alcohol solubility. If one of the more reactive phenolic substances, such as cresol, or the like, be used, a reaction period of four hours has been found adequate. If the phenolic reagent is one which is less reactive, such, for example, as chlorocresol, it is desirable to dissolve the catalyst in the phenolic content and to carry out the reaction by a slow addition of the naphtha to the thus activated phenolic content of the reaction mixture.

In conducting my process, I prefer to use one of the more commercially available and economical phenols, such as cresol or phenol, since they are of relatively low cost, and because their use simplifies the conduct of the reaction.

By following the above described procedure, I obtain resinous products, both hard and soft, which have particularly good alcohol solubility, and which are produced in good yield. Both the hard resin and the soft resin are usable in lacquers and the like, because of their alcohol solubility and compatibility with nitrocellulose. The resins also have the quality of gel-retardance with China wood oil, having a mild effect in preventing gas checking, and having antiskinning qualities as included in coating compositions. Whereas I speak of hard resin and a soft fluid resin, it should be understood that these resins are both potentially present in the reactive blend, and that, as resin is recovered from the reactive blend, they are present in the form of a single, relatively soft, resinous body, subject to selective separation into resins of different melting-point, and different consistency at normal room temperature.

As the resinous products occur in solution in the carrying hydrocarbon liquid, in which reaction has taken place, this liquid contains traces of acid from the unspent portion of the catalyst. The resin itself has a substantial acid number. I have found that, by using a water solution of a strong base, such as sodium hydroxide, I may initially classify the resin in accordance with the quality of alcohol solubility, prior to its recovery in solid or semisolid state. In so doing, I agitate the hydocarbon liquid, containing the products of reaction, with a strong basic solution, such as a solution of sodium hydroxide.

This strong basic solution I add in a quantity and concentration in excess of that required to effect neutralization of any unspent acid in the liquid containing the products of reaction. By so doing, I produce stratification in the liquid, with formation of a layer of the hydrocarbon liquid containing resin in solution and a layer of the basic solution also containing resin taken up because of the alkalinity of the solution. These layers I then separate, as by drawing off the aqueous layer. Resin is recovered from the hydrocarbon layer by distillation in usual manner. The resin is recovered from the aqueous layer, that is, the solution of sodium hydroxide, or similar base, by acidification.

I have found that this recovery process acts selectively, the resin in the aqueous layer possessing in higher degree than that in the hydrocarbon layer solubility in alcohol. In my common procedure, I have found a 20% water solution of sodium hydroxide, in quantity adequate to carry the resin, suitable in effecting separation. Such separation divides the resin into approximately equal content in the layers of diverse liquids, with notably high alcohol solubility in the resin of the aqueous layer, and fair alcohol solubility in the resin of the hydrocarbon layer. By varying the concentration of the alkaline solution above and below 20%, I am able to vary qualitatively the two cuts of resin with respect to their alcohol solubility, concurrently varying the quantities of resin recoverable from the respective layers.

While such classification may be employed on other resins, my invention primarily resides in the discovery that it is useful in the qualitative classification of phenol-modified coumarone to obtain a recovered content of such resin having high alcohol solubility. If the resin has already been isolated, it is dissolved in a suitable hydrocarbon solvent, such as refined solvent naphtha, and qualitative recovery is conducted in the manner outlined above.

As the term "crude solvent naphtha" is used herein, it is to be understood as defining those primarily aromatic hydrocarbon liquids which contain polymerizables, and is not strictly to be limited to a specialized type of such hydrocarbon liquids. For example, drip oil may be considered as a crude solvent naphtha of the type which contains preponderantly polymerizables of the coumarone and indene type, although it also contains styrene polymerizables in substantial quantity.

Taking a crude solvent naphtha containing dicyclopentadiene as its preponderant polymerizable content, I have produced a mixed reaction involving those polymerizables and a phenolic reagent, as products of which reaction I recovered hard resin which is alcohol soluble and a fluid resin having, when heated, solvent power upon cellulose acetate. This reaction I conducted in accordance with the conditions given above, making a reaction mixture of the naphtha and phenolic reagents on the basis of a weight of the phenolic reagent in excess of 22% the weight of the polymerizables in the naphtha. To promote reaction I have used the sulphuric acid base catalysts noted above. Similarly, I maintained the reaction temperature below 60° C.

I claim as my invention:

1. The herein described selective recovery steps as practiced upon a solvent naphtha containing in solution alcohol soluble resinous products of a mixed reaction involving the polymerizables occurring initially in the solvent naphtha and a phenol to produce a phenol-modified coumarone resin and containing traces of an unspent acid catalyst, which recovery method comprises removing a portion of the resinous reaction products having greater alcohol solubility from solution in the hydrocarbon liquid by agitating with the solvent naphtha a water solution of a strong base in a quantity and concentration in excess of that adequate to effect neutralization in the liquid with consequent stratification into an aqueous layer containing resin of greater alcohol solubility and a solvent naphtha layer containing resin of lesser solubility, separating the two layers of diverse character, and individually recovering the resinous content of each.

2. The herein described method of classifying a body of phenol-modified coumarone resin having a substantial acid number in accordance with the quality of alcohol solubility which comprises commingling with a solution of the resin in a general organic solvent therefor a water solution of a strong base with consequent stratification into an aqueous layer containing resin of greater alcohol solubility and organic solvent layer containing resin of lesser alcohol solubility, separating the layers of diverse liquids, and recovering the contained resin individually therefrom.

3. The herein described method of classifying a body of phenol-modified coumarone resin for alcohol solubility in accordance with the procedure of claim 1 which comprises varying the concentration of the water solution of a strong base inversely to the desired alcohol solubility of the resin recoverable therefrom.

4. The herein described method of classifying a body of phenol-modified coumarone resin for alcohol solubility in accordance with the procedure of claim 2 which comprises varying the concentration of the water solution of a strong base inversely to the desired alcohol solubility of the resin recoverable therefrom.

JOSEPH RIVKIN.

CERTIFICATE OF CORRECTION.

Patent No. 2,098,361.   November 9, 1937.

JOSEPH RIVKIN.

It is hereby certified that error appears in the printed specification of the above numbered patent requiring correction as follows: Page 3, first column, lines 20 and 21, claim 1, for the words "hydrocarbon liquid" read solvent naphtha; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

in accordance with the conditions given above, making a reaction mixture of the naphtha and phenolic reagents on the basis of a weight of the phenolic reagent in excess of 22% the weight of the polymerizables in the naphtha. To promote reaction I have used the sulphuric acid base catalysts noted above. Similarly, I maintained the reaction temperature below 60° C.

I claim as my invention:

1. The herein described selective recovery steps as practiced upon a solvent naphtha containing in solution alcohol soluble resinous products of a mixed reaction involving the polymerizables occurring initially in the solvent naphtha and a phenol to produce a phenol-modified coumarone resin and containing traces of an unspent acid catalyst, which recovery method comprises removing a portion of the resinous reaction products having greater alcohol solubility from solution in the hydrocarbon liquid by agitating with the solvent naphtha a water solution of a strong base in a quantity and concentration in excess of that adequate to effect neutralization in the liquid with consequent stratification into an aqueous layer containing resin of greater alcohol solubility and a solvent naphtha layer containing resin of lesser solubility, separating the two layers of diverse character, and individually recovering the resinous content of each.

2. The herein described method of classifying a body of phenol-modified coumarone resin having a substantial acid number in accordance with the quality of alcohol solubility which comprises commingling with a solution of the resin in a general organic solvent therefor a water solution of a strong base with consequent stratification into an aqueous layer containing resin of greater alcohol solubility and organic solvent layer containing resin of lesser alcohol solubility, separating the layers of diverse liquids, and recovering the contained resin individually therefrom.

3. The herein described method of classifying a body of phenol-modified coumarone resin for alcohol solubility in accordance with the procedure of claim 1 which comprises varying the concentration of the water solution of a strong base inversely to the desired alcohol solubility of the resin recoverable therefrom.

4. The herein described method of classifying a body of phenol-modified coumarone resin for alcohol solubility in accordance with the procedure of claim 2 which comprises varying the concentration of the water solution of a strong base inversely to the desired alcohol solubility of the resin recoverable therefrom.

JOSEPH RIVKIN.

CERTIFICATE OF CORRECTION.

Patent No. 2,098,361.     November 9, 1937.

JOSEPH RIVKIN.

It is hereby certified that error appears in the printed specification of the above numbered patent requiring correction as follows: Page 3, first column, lines 20 and 21, claim 1, for the words "hydrocarbon liquid" read solvent naphtha; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,098,361.                                    November 9, 1937.

JOSEPH RIVKIN.

It is hereby certified that error appears in the printed specification of the above numbered patent requiring correction as follows: Page 3, first column, lines 20 and 21, claim 1, for the words "hydrocarbon liquid" read solvent naphtha; and that the said Letters Patent should be read with this correction therein that the same may conform to the record of the case in the Patent Office.

Signed and sealed this 22nd day of February, A. D. 1938.

Henry Van Arsdale,
(Seal)                                       Acting Commissioner of Patents.